US011513028B2

(12) United States Patent
Bellera et al.

(10) Patent No.: US 11,513,028 B2
(45) Date of Patent: Nov. 29, 2022

(54) APPARATUS FOR SENSING AN ELASTIC DEFORMATION OF A HOLLOW ELEMENT

(71) Applicants: AIRBUS HELICOPTERS, Marignane (FR); LIEBHERR AEROSPACE LINDENBERG GMBH, Lindenberg (DE)

(72) Inventors: Jacques Bellera, Aix en Provence (FR); Patrick Hellio, Bouc Bel Air (FR); Nicolas Queiras, Les Pennes Mirabeau (FR); Marcelo Duval, Sigmarszell (DE); Tobias Storz, Gruenkraut (DE)

(73) Assignees: AIRBUS HELICOPTERS, Marignane (FR); LIEBHERR AEROSPACE LINDENBERG GMBH, Lindenberg (DE)

( * ) Notice: Subject to any disclaimer, the term of this patent is extended or adjusted under 35 U.S.C. 154(b) by 558 days.

(21) Appl. No.: 16/600,643

(22) Filed: Oct. 14, 2019

(65) Prior Publication Data
US 2020/0116584 A1 Apr. 16, 2020

(30) Foreign Application Priority Data
Oct. 16, 2018 (EP) .................................... 18400028

(51) Int. Cl.
*G01M 5/00* (2006.01)
*G01G 19/07* (2006.01)
*G01M 1/12* (2006.01)

(52) U.S. Cl.
CPC .............. *G01M 5/00* (2013.01); *G01G 19/07* (2013.01); *G01M 1/125* (2013.01)

(58) Field of Classification Search
CPC . G01L 1/04; G01L 1/125; G01L 1/183; G01L 1/26; G01L 5/0004; G01G 21/30; G01G 19/07; G01M 5/00
(Continued)

(56) References Cited

U.S. PATENT DOCUMENTS 3,426,586 A 2/1969 Kadlec
3,488,997 A 1/1970 Kliever
(Continued)

FOREIGN PATENT DOCUMENTS

CA 3005505 A1 * 12/2018 ........... B64C 25/001
CA 3058186 A1 * 12/2019 ............. G01G 19/07
(Continued)

OTHER PUBLICATIONS

European Search Report for European Application No. EP 18400028. 9, Completed by the European Patent Office, dated Apr. 2, 2019, 13 pages.

*Primary Examiner* — Atul Trivedi
(74) *Attorney, Agent, or Firm* — Brooks Kushman P.C.

(57) ABSTRACT

An apparatus for sensing an elastic deformation of a hollow element, wherein the apparatus comprises at least one sensor that is arranged in a watertight capsule which is connected in a watertight manner to a connector device comprising at least one watertight electrical connector that is electrically connected to the at least one sensor, the at least one watertight electrical connector forming a first waterproof barrier of the connector device between an outside of the watertight capsule and the at least one sensor, and wherein the connector device comprises at least one further waterproof barrier that is formed between the first waterproof barrier and the at least one sensor.

20 Claims, 4 Drawing Sheets

(58) Field of Classification Search
USPC .......................................................... 73/781
See application file for complete search history.

(56) References Cited

U.S. PATENT DOCUMENTS

| | | | |
|---|---|---|---|
| 4,312,042 A | 1/1982 | Bateman | |
| 4,503,922 A | 3/1985 | Brosh et al. | |
| 5,205,514 A | 4/1993 | Patzig et al. | |
| 7,578,199 B2 | 8/2009 | Giazotto | |
| 8,181,532 B2 | 5/2012 | Schmidt et al. | |
| 8,398,029 B2 | 3/2013 | Leroy et al. | |
| 2006/0283239 A1* | 12/2006 | Leroy | G01G 19/07 |
| | | | 244/100 R |
| 2007/0057118 A1* | 3/2007 | Bietenhader | B64C 25/04 |
| | | | 244/102 R |
| 2007/0186672 A1* | 8/2007 | Friedberger | G01L 19/0636 |
| | | | 73/802 |
| 2007/0227239 A1* | 10/2007 | Perriard | G01L 3/1478 |
| | | | 73/129 |
| 2013/0192903 A1* | 8/2013 | Dubois | G01G 7/02 |
| | | | 177/136 |
| 2016/0327958 A1 | 11/2016 | Vallart et al. | |
| 2018/0372535 A1* | 12/2018 | Bailly | B64C 25/34 |
| 2019/0120684 A1* | 4/2019 | Oren | G01G 19/07 |
| 2019/0323908 A1* | 10/2019 | Isono | G01L 1/2231 |

FOREIGN PATENT DOCUMENTS

| | | | | |
|---|---|---|---|---|
| CN | 205192583 U | | 4/2016 | |
| CN | 109855789 A | * | 6/2019 | |
| CN | 110388999 A | * | 10/2019 | ............ B60B 27/00 |
| EP | 0026446 A2 | | 4/1981 | |
| EP | 0026446 A3 | | 5/1981 | |
| EP | 0482289 A2 | | 4/1992 | |
| EP | 1505380 A2 | | 2/2005 | |
| EP | 1505380 A3 | | 9/2006 | |
| EP | 3214401 A1 | * | 9/2017 | ........... B60G 17/021 |
| FR | 2564582 A1 | | 11/1985 | |
| WO | 2004074787 A1 | | 9/2004 | |
| WO | 2005022098 A1 | | 3/2005 | |

* cited by examiner

APPARATUS FOR SENSING AN ELASTIC DEFORMATION OF A HOLLOW ELEMENT

CROSS-REFERENCE TO RELATED APPLICATIONS

This application claims priority to European patent application No. EP 18400028.9 filed on Oct. 16, 2018, the disclosure of which is incorporated in its entirety by reference herein.

BACKGROUND OF THE INVENTION

(1) Field of the Invention

The invention is related to an apparatus and, more particularly, to a line replaceable unit for sensing an elastic deformation of a hollow element, in particular of a hollow element of an undercarriage of an aircraft, wherein the hollow element is connected to at least one ground-contacting member and wherein the hollow element is deformable by the weight of the aircraft standing by means of the at least one ground-contacting member on a surface.

(2) Description of Related Art

In general, such an apparatus can be used with a device for determining the weight and even the position of the center of gravity of an aircraft, such as a rotary-wing aircraft, which are critical factors for a safe and efficient operation of the aircraft. In fact, prior to each flight operation of the aircraft, i. e. prior to takeoff, the pilot of the aircraft must ensure that the weight, and the balance of the aircraft relative to its center of gravity do not exceed limits that are predefined by the manufacturer of the aircraft. Therefore, different devices have been developed that can be used for determining the weight of a given aircraft. Such devices may generally be divided into external weighing devices that are not mounted on board of the aircraft and that are intended to weigh the aircraft in empty state, and so-called on-board devices that are permanently installed on the aircraft.

Document U.S. Pat. No. 3,426,586 describes an on-board device that is provided with a deformable tube having strain gauges, with one such tube being inserted into the axle of each undercarriage of a respective aircraft. The deformation of each tube as measured by the strain gauges makes it possible to deduce the total weight of the aircraft and the position of its center of gravity.

Document U.S. Pat. No. 3,438,997 describes another on-board device for measuring the weight and the position of the center of gravity of a given aircraft having an undercarriage that is provided with at least one ground-contacting member having a deformable element. In this on-board device, a bar is arranged inside of the deformable element and two sensors that are arranged on the deformable element via arms measure the movement of the bar respectively at two ends of the bar via arms. More specifically, when a force is exerted on each ground-contacting member of the aircraft, a free first portion of the deformable element carrying a first sensor deforms, while a second portion of the deformable element carrying a second sensor remains relatively stationary. The two sensors are consequently arranged on the deformable element for measuring the movement of the deformable element via arms.

Document U.S. Pat. No. 8,398,029 B2 describes still another on-board device for determining the weight and the position of the center of gravity of an aircraft having a plurality of undercarriages. Each undercarriage is provided with at least one ground-contacting member having an element that is deformable under the action of the weight of the aircraft when the aircraft is standing on a surface. The deformable element is provided with a bar having an eddy current sensor at its free end, the bar being arranged inside of the deformable element.

Document WO 2004/074787 A1 describes still another device that is provided with a first portion, a second portion, and an elongate member having a magnetized region, the elongate member being attached to the first and second portions. At least one magnetic field probe element is used for detecting a distortion of the magnetic field emanating from the elongate member when a load is exerted on one of the first and second portions. More specifically, at least one pair of probe elements may be used, such that the signal representing the bending moment of the elongate member corresponds to a difference between the signals from the two probe elements of the at least one pair.

Document U.S. Pat. No. 4,312,042 suggests to measure a bending angle of an element of each undercarriage of a given aircraft by means of two inclinometers in order to obtain a direct indication concerning the weight, of the given aircraft.

Other devices that can be used for determining the weight and the position of the center of gravity of a given aircraft are e. g. described in the documents U.S. Pat. No. 3,483,997, FR 2 564 582 A1, EP 0 026 446 A1, EP 0 482 289 A1, U.S. Pat. Nos. 4,503,922, 7,578,199 B2, 8,181,532 B2, and US 2016/0327958 A1.

Still another on-board device for determining the weight and the position of the center of gravity of an aircraft having a plurality of undercarriages is described in the document US 2013/0192903 A1. This on-board device is used in particular for measuring the weight of an aircraft having a plurality of undercarriages, wherein each undercarriage is provided with a hollow element extending from a first end to a second end. The first end may be secured to a connection member connecting it to a structure of the aircraft. The second end carries at least one ground-contacting member and is deformable under the action of the weight of the aircraft when the aircraft is standing on a surface. More specifically, the on-board device includes a bar that extends inside of the hollow element from an embedded end, which is e. g. fastened to the first end and/or to the connection member, towards a free end. A top internal zone of the hollow element is above the free end which, in turn, is above a bottom internal zone of the hollow element opposite from the top internal zone. Consequently, when the aircraft is standing on ground, the second end of the hollow element deforms, unlike the bar which remains in an initial shape. As a result, the bottom internal zone of the hollow element tends to move towards the free end of the bar, while the top internal zone of the hollow element tends to move away from the free end.

The on-board device according to document US 2013/0192903 A1 also includes first and second sensors that are arranged on the free end in order to take, respectively, a first measurement relating to a top distance between the free end and the top internal zone, and a second measurement relating to a bottom distance between the free end and the bottom internal zone. Furthermore, the on-board device is provided with a processor unit connected to at least one of the sensors to deduce weight information therefrom. The processor unit may use the information coming from a single sensor in conventional manner, or it may make use of an average of the information coming from the first and second sensors in order to deduce weight information therefrom. Furthermore, each one of the first and second measurements is representative of the deformation to which the deformable hollow element is subjected under the action of the weight of the aircraft, with the sensors being mounted inside of the deformable hollow element. Each sensor thus delivers to the processor unit a main signal that, is proportional to the deformation of the hollow element as measured in terms of a distance. The processor unit, e. g. a computer of the aircraft, makes use of these main signals for calculating the weight or indeed the position of the center of gravity of the aircraft using known methods.

However, it should be noted that at least a part of the above-described on-board devices may not only be used for determining the weight and even the position of the center of gravity of an aircraft, such as a rotary-wing aircraft. Instead, these on-board devices may simultaneously or alternatively be used e. g. for determining whether a respective aircraft, such as a rotary-wing aircraft, is standing on ground or flying. Thus, these on-board devices may advantageously foe used to improve respective flight conducting systems in order to enable a safe and reliable operation of the respective aircraft on ground and during flight.

More specifically, operation of the respective aircraft on ground and during flight and, in particular, specific operation phases such as landing, rolling, and taking-off may generally lead to dangerous situations. For improving control of the aircraft during such specific operation phases, it is of major importance to guarantee functioning of all components associated with a respective flight conducting system in order to avoid critical situations. Consequently, the above-described on-board devices, when used to improve respective flight conducting systems, are subject to increased safety and functioning requirements. In fact, erroneous data that is provided by such an on-board device to an associated flight conducting system may lead to disastrous and even catastrophic operating situations, as all decisions taken by the associated flight conducting systems on the basis of the erroneous data are potentially critical decisions. In this respect it should be noted that occurrence of such erroneous data is mostly linked to maintenance errors and environmental constraints, which must therefore be considered very carefully when implementing a respective on-board device.

More specifically, the above-described on-board systems are all at least partly mounted to the undercarriages of associated aircrafts and, thus, comparatively close to an underground on which the aircrafts are moving prior to takeoff or after landing. Thus, these on-board systems are particularly exposed to environmental impacts, such as e. g. humidity, rain, frost, snow, dust, mud, gravel, and so on. Such environmental impacts may significantly affect respective measurements performed by the on-board devices and, thereby, also affect the security of the flight conducting system that processes the respective measurements. Similar problems may occur during mounting and maintenance of the on-board devices.

BRIEF SUMMARY OF THE INVENTION

It is, therefore, the object of the present invention to provide a new on-board device for determining the effort of the ground on an aircraft having a plurality of undercarriages, the on-board device being reliable and secure and showing an improved robustness with respect to applicable environmental impacts in order to be useable by critical systems, such as an AutoPilot or a Fly-by-Wire system, of an aircraft and, more generally, a new apparatus for sensing an elastic deformation of a hollow element.

This object is solved by an apparatus for sensing an elastic deformation of a hollow element, the apparatus comprising the features of claim 1.

More specifically, according to the present invention the apparatus for sensing an elastic deformation of a hollow element comprises at least one sensor that is arranged in a watertight capsule. The watertight capsule is connected in a watertight manner to a connector device comprising at least one watertight electrical connector that is electrically connected to the at least one sensor. The at least one watertight electrical connector forms a first waterproof barrier of the connector device between an outside of the watertight capsule and the at least one sensor, and the connector device comprises at least one further waterproof barrier that is formed between the first waterproof barrier and the at least one sensor.

According to one aspect, the apparatus is used for sensing an elastic deformation of a hollow element of an undercarriage of an aircraft, the hollow element being connected to at least one ground-contacting member and being deformable by the weight of the aircraft standing by means of the at least one ground-contacting member on a surface. However, the apparatus is preferably not limited for use with such an undercarriage of an aircraft but may instead be used with various different vehicles in general, such as e. g. cars, buses, and so on. Furthermore, the apparatus may be used at other locations than undercarriages, e. g. in connection with a rotor shaft of a rotary-wing aircraft, a cardan shaft of a car or a bus, and so on.

Advantageously, the apparatus for sensing an elastic deformation of a hollow element is provided with the watertight capsule that encloses the at least one sensor that is provided for sensing the elastic deformation. The watertightness of the watertight capsule allows to protect the at least one sensor and, thus, the apparatus against all possibly detrimental environmental impacts, such as e. g. humidity, rain, frost, snow, dust, mud, gravel, and so on. Furthermore, the apparatus may advantageously be exchanged if a malfunctioning of the at least one sensor is detected, e. g. due to breaking of the watertight capsule.

According to one aspect, the at least one sensor does not sense an elastic deformation of the hollow element directly, but instead preferably measures an elastic deformation of the watertight capsule. As the watertight capsule is preferentially mechanically linked to the hollow element, an elastic deformation of the hollow element is directly transferred by the hollow element to the watertight capsule and results, thus, in a corresponding elastic deformation of the watertight capsule. A correspondingly sensed elastic deformation of the watertight capsule and, thus, the hollow element can be used for deducting the load applied on the ground-contacting member.

According to one aspect, the watertightness of the apparatus is improved by providing the further waterproof barrier. In fact, the apparatus is completely watertight in the region of the watertight capsule. In the region of the at least one watertight electrical connector and in a region where the apparatus transits from the at least one watertight electrical connector to the watertight capsule, the further waterproof barrier is advantageously provided. Consequently, even if an insufficient watertightness of the at least one watertight electrical connector occurs, which may e. g. occur after a comparatively long duration of use of the apparatus, there is still the further waterproof barrier which protects the at least one sensor. Thus, the apparatus may be provided with an improved watertightness which ensures a level of protection with respect to water ingress, which is compatible to a level of criticism of the measurement data that must be protected, i. e. the measurements provided by the at least one sensor and used for determining the load applied on the undercarriage.

Advantageously, the apparatus for sensing an elastic deformation of a hollow element allows to enclose the at least one sensor hermetically inside of the watertight capsule for a comparatively long duration, preferentially over its complete lifetime, even if the first waterproof barrier defined by the at least one watertight electrical connector is degraded over time. Thus, provision of the watertight capsule allows to simplify maintenance and also allows an easy and quick exchange or replacement of the apparatus in the form of an autonomous module, if required. Even during such an exchange or replacement, immunity of the at least one sensor with respect to pollution and exterior agents, i. e. environmental impacts, is guaranteed.

According to one aspect, the at least one further waterproof barrier comprises a second waterproof barrier that is formed by a sealed compartment of the connector device. The sealed compartment is arranged between the at least one watertight electrical connector and the at least one sensor.

Preferably, the sealed compartment is filled with an associated filling material. The associated filling material preferably comprises at least one of a resin or a silicone. However, other filling materials are likewise contemplated and may e. g. be selected depending on operational constraints requested for the aircraft certification, targets for ageing effects, and manufacturing constraints. More specifically, the operational constraints may e. g. include environmental conditions such as external temperature envelope, e. g. hot and cold soak, and so on, as well as specific thermal behavior during breaking. The latter usually depends e. g. on an underlying type of aircraft as such, e. g. its weight, and so on, and operational conditions claimed in a respective flight manual of the aircraft, such as e. g. characteristics of the authorized rolling landing. The manufacturing constraints e. g. include an ageing target, weight, costs, and so on.

According to one aspect, the at least one further waterproof barrier comprises a third waterproof barrier that is formed by a cable bushing of the connector device. A connecting cable that electrically connects the at least one watertight electrical connector to the at least one sensor is preferably routed through the sealed compartment and exits the connector device towards the at least one sensor via the cable bushing. The cable bushing is preferably arranged between the sealed compartment and the at least one sensor. Furthermore, the connector device preferably comprises a mounting cup. Preferentially, the at least one watertight electrical connector is mounted to the mounting cup by means of a connector board that is attached via a sealed connection to the mounting cup. Preferably, the mounting cup comprises an opening through which the connecting cable exits the connector device towards the at least one sensor. Preferentially, the cable bushing is arranged in the opening.

According to one aspect, the watertight capsule is retained at the mounting cup via a welded connection. In fact, a pure mechanical link that ensures the sealing between the watertight capsule and the mounting cup is preferred for attaching the watertight capsule to the mounting cup. This is advantageously achieved via the welded connection. Without welding, a specific device is required that is suitable to ensure that a mechanical bending of the hollow element is correctly transmitted to the watertight capsule. By way of example, the specific device must be arranged between the hollow element and the watertight capsule in order to guarantee that there is no free space, i. e. play, between both components. In other words, the specific device guarantees a correct measurement by the at least one sensor of an elastic deformation, respectively bending, of the hollow element and, similarly, of the watertight capsule and, hence, correct detection of ground contact with a requested and required accuracy. Again, the material used to ensure the bonding will depend on underlying operational constraints, such as temperature, breaking effect, and so on, as well as manufacturing constraints, such as ageing constraints, and so on.

According to one aspect, the mounting cup is at least partly arranged within an associated mounting sleeve. A mounting ring is preferably arranged in radial direction between the mounting cup and the associated mounting sleeve. This mounting ring is preferably provided to ensure transmission of a deformation of the hollow element to the watertight capsule in the region of the mounting ring.

According to one aspect, the connector device comprises a mounting block. Preferably, the at least one watertight electrical connector is mounted to the mounting block by means of a connector board that is attached via a sealed connection to the mounting block. The mounting block preferably comprises an opening through which the connecting cable exits the connector device towards the at least one sensor, wherein the cable bushing is preferentially arranged in the opening. Furthermore, the mounting block preferably comprises a solid block corpus that is arranged between the sealed compartment and the opening. The solid block corpus preferably comprises at least one cable channel, that connects the sealed compartment to the opening.

According to one aspect, the solid block corpus comprises metal. However, it should be noted that the kind of material that is used for realizing the solid block corpus generally depends on operational constraints to be sustained, as well as manufacturing constraints, including weight and costs. In any case, it should be noted that the mounting cup realizes an undeformable part of the apparatus according to the present invention. Therefore, metal is preferred. Furthermore, metal is most appropriate for creating a welded connection as described above.

According to one aspect, the watertight capsule is integrally formed in one piece with the mounting block.

According to one aspect, the watertight capsule comprises a flexible region provided for allowing at least a vertical bending of the watertight capsule in operation. More specifically, the flexible region is provided for compensating longitudinal forces acting on the watertight capsule, as well as to provide tolerances and reduce bending forces and linearization of the at least one sensor.

According to one aspect, the watertight capsule comprises a conductive material. Preferably, the conductive material comprises metal. In general, selection of an appropriate conductive material depends on operational constraints, such as e. g. a capability of bending in accordance with an elastic deformation of the hollow element, as well as manufacturing choices, such as e. g. a capability to perform welding, a capability to be qualified, e. g. with respect to mechanical constraints, electrical constraints and so on. Another property, that is required by the conductive material, is related to lightning strike requirements.

According to one aspect, a stiff rod is provided inside of the watertight capsule. The stiff rod preferably supports the at least one sensor. Preferentially, the stiff rod is connected to the connector device via a static attachment. Preferably, the stiff rod is integrally formed in one piece with the connector device. More specifically, the stiff rod is provided in order to ensure that the at least one sensor is correctly positioned inside of the watertight capsule. Thus, the stiff rod enables contact between the at least one sensor and the watertight capsule, which is required in order to obtain a sufficient accuracy of respective measurements. Furthermore, it allows knowledge of a particular location of the at least one sensor inside of the watertight capsule, i. e. without drift and, thus, enabling estimation of a bending effect of the hollow element on the at least one sensor, so that a correct calibration of respectively obtained sensor data is possible. Furthermore, the stiff rod advantageously enables a correct routing of all connecting cables inside the watertight capsule between the at least one sensor and the at least one watertight electrical connector.

In other words, the stiff rod must ensure a coherence of sensor mounting and offer sufficient stiffness whatever the operational constraints are, i. e. hot and cold temperature, breaking effect of the hollow elements, e. g. by means of thermal dilatation, and so on. Consequently, an accurate sensor measurement requires use of a one-piece design for the stiff rod and the connector device according to a preferred aspect. In fact, the stiff rod should preferably be implemented as a fixed part for sensor mounting.

The present invention further provides a line replaceable unit for sensing an elastic deformation of a hollow element of an undercarriage of an aircraft, the hollow element being connected to at least one ground-contacting member and being deformable by the weight of the aircraft standing by means of the at least one ground-contacting member on a surface. The line replaceable unit comprises at least one sensor that is arranged in a watertight capsule. The watertight capsule is connected in a watertight manner to a connector device comprising at least one watertight electrical connector that is electrically connected to the at least one sensor. The at least one watertight electrical connector forms a waterproof barrier of the connector device between an outside of the watertight capsule and the at least one sensor.

Advantageously, the line replaceable unit for sensing an elastic deformation of a hollow element of an undercarriage of an aircraft is provided with the watertight capsule that encloses the at least one sensor that is provided for sensing the elastic deformation. The watertightness of the watertight capsule allows to protect the at least one sensor and, thus, the line replaceable unit against all possibly detrimental environmental impacts, such as e. g. humidity, rain, frost, snow, dust, mud, gravel, and so on. Furthermore, the line replaceable unit may advantageously be exchanged if a malfunctioning of the at least one sensor is detected, e. g. due to breaking of the watertight capsule.

Furthermore, the line replaceable unit according to the present invention allows to enclose the at least one sensor hermetically inside of the watertight capsule for a comparatively long duration, preferentially over its complete lifetime, even if the waterproof barrier defined by the at least one watertight electrical connector is degraded over time. Thus, provision of the watertight capsule allows to simplify maintenance and also allows an easy and quick exchange or replacement of the line replaceable unit in the form of an autonomous module, if required. Even during such an exchange or replacement, immunity of the at least one sensor with respect to pollution and exterior agents, i. e. environmental impacts, is guaranteed.

According to one aspect, the at least one sensor does not sense an elastic deformation of the hollow element directly, but instead preferably measures an elastic deformation of the watertight capsule. As the watertight capsule is preferentially mechanically linked to the hollow element, each elastic deformation of the hollow element is directly transferred by the hollow element to the watertight capsule and results, thus, in a corresponding elastic deformation of the watertight capsule. A correspondingly sensed elastic deformation of the watertight capsule and, thus, the hollow element can be used for deducting the load applied on the undercarriage.

According to one aspect, the watertight capsule comprises a flexible region provided for allowing at least a vertical bending of the watertight capsule in operation. More specifically, the flexible region is provided for compensating longitudinal forces acting on the watertight capsule, as well as to provide tolerances and reduce bending forces and linearization of the at least one sensor.

According to one aspect, the watertight capsule comprises a conductive material. Preferably, the conductive material comprises metal. In general, selection of an appropriate conductive material depends on operational constraints, such as e. g. a capability of bending in accordance with an elastic deformation of the hollow element, as well as manufacturing choices, such as e. g. a capability to perform welding, a capability to foe qualified, e. g. with respect to mechanical constraints, electrical constraints and so on. Another property, that is required by the conductive material, is related to lightning strike requirements.

According to one aspect, a stiff rod is provided inside of the watertight capsule. The stiff rod preferably supports the at least one sensor. Preferentially, the stiff rod is connected to the connector device via a static attachment. Preferably, the stiff rod is integrally formed in one piece with the connector device. More specifically, the stiff rod is provided in order to ensure that the at least one sensor is correctly positioned inside of the watertight capsule. Thus, the stiff rod enables contact between the at least one sensor and the watertight capsule, which is required in order to obtain a sufficient accuracy of respective measurements. Furthermore, it allows knowledge of a particular location of the at least one sensor inside of the watertight capsule, i. e. without drift and, thus, enabling estimation of a bending effect of the hollow element on the at least one sensor, so that a correct calibration of respectively obtained sensor data is possible. Furthermore, the stiff rod advantageously enables a correct routing of all connecting cables inside the watertight capsule between the at least one sensor and the at least one watertight electrical connector.

In other words, the stiff rod must ensure a coherence of sensor mounting and offer sufficient stiffness whatever the operational constraints are, i. e. hot and cold temperature, breaking effect of the hollow elements, e. g. by means of thermal dilatation, and so on. Consequently, an accurate sensor measurement requires use of a one-piece design for the stiff rod and the connector device according to a preferred aspect. In fact, the stiff rod should preferably be implemented as a fixed part for sensor mounting.

According to one aspect, the connector device comprises at least one further waterproof barrier that is formed between the waterproof barrier and the at least one sensor. Advantageously, the watertightness of the line replaceable unit is improved by providing the further waterproof barrier. In fact, the line replaceable unit is completely watertight in the region or the watertight capsule. In the region of the at least one watertight electrical connector and in a region where the line replaceable unit transits from the at least one watertight electrical connector to the watertight capsule, the further waterproof barrier is advantageously provided. Consequently, even if an insufficient watertightness of the at least one watertight electrical connector occurs, which may e. g.

occur after a comparatively long duration of use of the line replaceable unit, there is still the further waterproof barrier which protects the at least one sensor. Thus, the line replaceable unit may be provided with an improved watertightness which ensures a level of protection with respect to water ingress, which is compatible to a level of criticism of the measurement data that must be protected, i. e. the measurements provided by the at least one sensor and used for determining the load applied on the undercarriage.

According to one aspect, the at least one further waterproof barrier comprises a first waterproof barrier that is formed by a sealed compartment of the connector device. The sealed compartment is arranged between the at least one watertight electrical connector and the at least one sensor.

Preferably, the sealed compartment is filled with an associated filling material. The associated filling material preferably comprises at least one of a resin or a silicone. However, other filling materials are likewise contemplated and may e. g. be selected depending on operational constraints requested for the aircraft certification, targets for ageing effects, and manufacturing constraints. More specifically, the operational constraints may e. g. include environmental conditions such as external temperature envelope, e. g. hot and cold soak, and so on, as well as specific thermal behavior during breaking. The latter usually depends on the aircraft as such, e. g. its weight, and so on, and operational conditions claimed in a respective flight manual of the aircraft, such as e. g. characteristics of the authorized rolling landing. The manufacturing constraints e. g. include an ageing target, weight, costs, and so on.

According to one aspect, the at least one further waterproof barrier comprises a second waterproof barrier that is formed by a cable bushing of the connector device. A connecting cable that electrically connects the at least one watertight electrical connector to the at least one sensor is preferably routed through the sealed compartment and exits the connector device towards the at least one sensor via the cable bushing. The cable bushing is preferably arranged between the sealed compartment and the at least one sensor. Furthermore, the connector device preferably comprises a mounting cup. Preferentially, the at least one watertight electrical connector is mounted to the mounting cup by means of a connector board that is attached via a sealed connection to the mounting cup. Preferably, the mounting cup comprises an opening through which the connecting cable exits the connector device towards the at least one sensor. Preferentially, the cable bushing is arranged in the opening.

According to one aspect, the watertight capsule is retained at the mounting cup via a welded connection. In fact, a pure mechanical link that ensures the sealing between the watertight capsule and the mounting cup is preferred for attaching the watertight capsule to the mounting cup. This is advantageously achieved via the welded connection. Without welding, a specific device is required that is suitable to ensure that a mechanical bending of the hollow element is correctly transmitted to the watertight capsule. By way of example, the specific device must be arranged between the hollow element and the watertight capsule in order to guarantee that there is no free space, i. e. play, between both components. In other words, the specific device guarantees a correct measurement by the at least one sensor of an elastic deformation, respectively bending, of the hollow element and, similarly, of the watertight capsule and, hence, correct detection of ground contact with a requested and required accuracy. Again, the material used to ensure the bonding will depend on underlying operational constraints, such as temperature, breaking effect, and so on, as well as manufacturing constraints, such as ageing constraints, and so on.

According to one aspect, the mounting cup is at least partly arranged within an associated mounting sleeve. A mounting ring is preferably arranged in radial direction between the mounting cup and the associated mounting sleeve. This mounting ring is preferably provided to ensure transmission of a deformation of the hollow element to the watertight capsule in the region of the mounting ring.

According to one aspect, the connector device comprises a mounting block. Preferably, the at least one watertight electrical connector is mounted to the mounting block by means of a connector board that is attached via a sealed connection to the mounting block. The mounting block preferably comprises an opening through which the connecting cable exits the connector device towards the at least one sensor, wherein the cable bushing is preferentially arranged in the opening. Furthermore, the mounting block preferably comprises a solid block corpus that is arranged between the sealed compartment and the opening. The solid block corpus preferably comprises at least, one cable channel that connects the sealed compartment to the opening.

According to one aspect, the solid block corpus comprises metal. However, it should be noted that the kind of material that is used for realizing the solid block corpus generally depends on operational constraints to be sustained, as well as manufacturing constraints, including weight and costs. In any case, it should be noted that the mounting cup realizes an undeformable part of the line replaceable unit according to the present invention. Therefore, metal is preferred. Furthermore, metal is most appropriate for creating a welded connection as described above.

According to one aspect, the watertight capsule is integrally formed in one piece with the mounting block.

BRIEF DESCRIPTION OF THE DRAWINGS

Preferred embodiments of the invention are outlined by way of example in the following description with reference to the attached drawings. In these attached drawings, identical or identically functioning components and elements are labelled with identical reference numbers and characters and are, consequently, only described once in the following description.

DETAILED DESCRIPTION OF THE INVENTION

Figure 1:
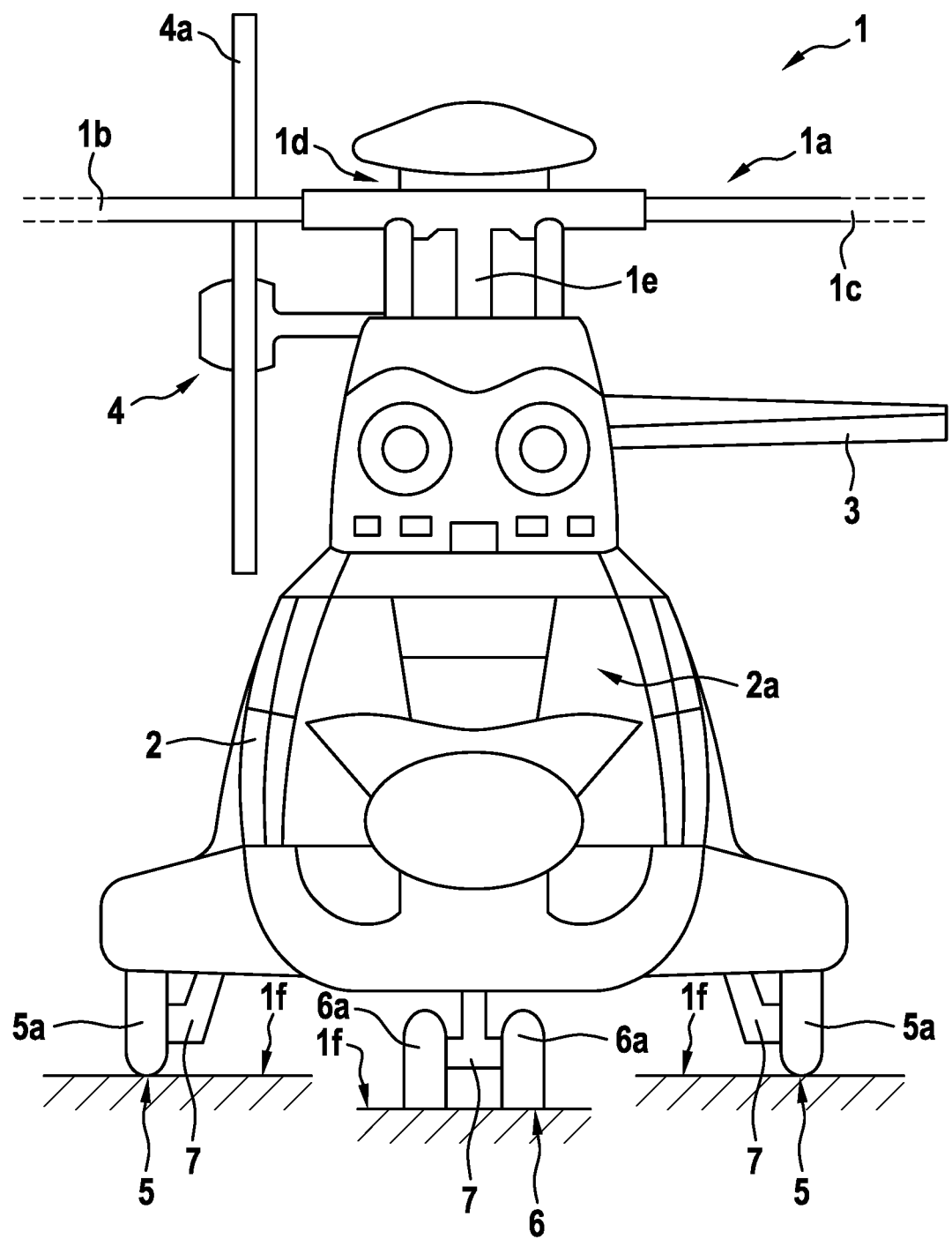
FIG. 1 shows a front view of an aircraft with three undercarriages.

FIG. 1 shows an aircraft 1 that is exemplarily embodied as a rotary-wing aircraft and, more particularly, as a helicopter. Thus, for purposes of simplicity and clarity, the aircraft 1 is hereinafter referred to as the "helicopter" 1.

Illustratively, the helicopter 1 comprises a fuselage 2 that exemplarily forms a cabin 2a. The helicopter 1 further comprises at least one main rotor 1a for providing lift and forward or backward thrust during operation, which is exemplarily embodied as a multi-blade main rotor. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, the helicopter 1 further comprises at least one counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of a tail boom of the helicopter 1 and preferably comprises a tail rotor 4a. Illustratively, the tail boom is also provided with a suitable horizontal stabilizer 3.

Illustratively, the helicopter 1 stands on a surface 1f. By way of example, and for purposes of illustration, the surface 1f is hereinafter also referred to as "ground 1f".

According to one aspect, the helicopter 1 is provided with a predetermined number of undercarriages 5, 6 for standing on the ground 1f. By way of example, the helicopter 1 is provided with two single ground-contacting member undercarriages 5 and one double ground-contacting member undercarriage 6.

Each one of the single ground-contacting member undercarriages 5 is illustratively provided with a single ground-contacting member 5a which is exemplarily embodied as a wheel. The single-ground contacting member 5 is further described below with reference to FIG. 2.

The double ground-contacting member undercarriage 6 is illustratively provided with two ground-contacting members 6a, each of which is also exemplarily embodied as a wheel. The double ground-contacting member undercarriage 6 is further described below with reference to FIG. 3.

According to one aspect, each one of the single ground-contacting member undercarriages 5 and the double ground-contacting member undercarriage 6 is provided with at least one hollow element 7. Each one of the hollow elements 7 preferably connects an associated one of the wheels 5a, 6a to the fuselage 2 of the helicopter 1.

Under the action of the weight of the helicopter 1, the single ground-contacting member undercarriages 5 and the double ground-contacting member undercarriage 6 deform. More specifically, the hollow elements 7 generally deform elastically and by sensing and measuring respective elastic deformations of the hollow elements 7, the weight of the helicopter 1 and also the position of its center of gravity can be determined. Likewise, by sensing and measuring the respective elastic deformations of the hollow elements 7 it can be determined whether the helicopter 1 is standing or rolling on ground, or whether it is flying.

Figure 2:
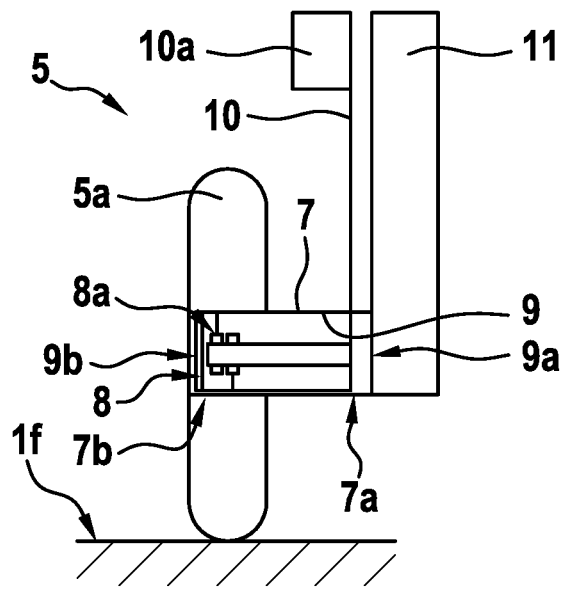
FIG. 2 shows a schematic view of a first type of undercarriage that is provided with an apparatus according to the present invention for sensing an elastic deformation of a hollow element, of the undercarriage.

FIG. 2 shows one of the single ground-contacting member undercarriages 5 of FIG. 1 that is provided with the wheel 5a which is connected to the hollow element 7 according to FIG. 1. The hollow element 7 in turn is connected via a connecting component 11 to the fuselage 2 of the helicopter 1 of FIG. 1. The connecting component 11 may e. g. be a shock absorber or a retracting actuator that is connected to the fuselage 2.

Illustratively, the hollow element 7 extends from a mounting end 7a to a free end 7b. The mounting end 7a is fastened, i. e. preferably rigidly mounted to the connecting component 11, and the free end 7b is fastened, i. e. preferably removably mounted to the wheel 5a, which is illustratively standing on the ground 1f of FIG. 1. Preferably, the hollow element 7 is the wheel axle, i. e. the shaft on which the wheel 5a is arranged.

Under the action of the weight of the helicopter 1 of FIG. 1 on the ground 1f, the free end 7b to which the wheel 5a is mounted will be deformed elastically. This elastic deformation is preferably sensed by an apparatus 8 according to the present invention.

However, it should be noted that the apparatus 8 is not restricted to use with the hollow element 7 of the undercarriage 5. Various other possible uses are likewise contemplated and described below.

According to one aspect, the apparatus 8 comprises at least one sensor 8a that is arranged in a watertight capsule 9. The watertight capsule 9 is preferably removably mounted to the hollow element 7 and, more specifically, inside of the hollow element 7. Illustratively, the watertight capsule 9 has a mounting end region 9a that is arranged at the mounting end 7a of the hollow element 7, and a free end region 9b that is arranged at the free end 7b of the hollow element 7.

Preferably, the at least one sensor 8a is connected by a wired and/or wireless data transmission and/or energy supply link 10 to an associated transceiver 10a, e. g. a wireless transceiver 10a. The transceiver 10a is suitable to receive measurements from the at least one sensor 8a and to transmit the latter to suitable processor means that are adapted to determine on the basis of the transmitted measurements the weight and/or the position of the center of gravity of the aircraft 1 of FIG. 1.

Figure 3:
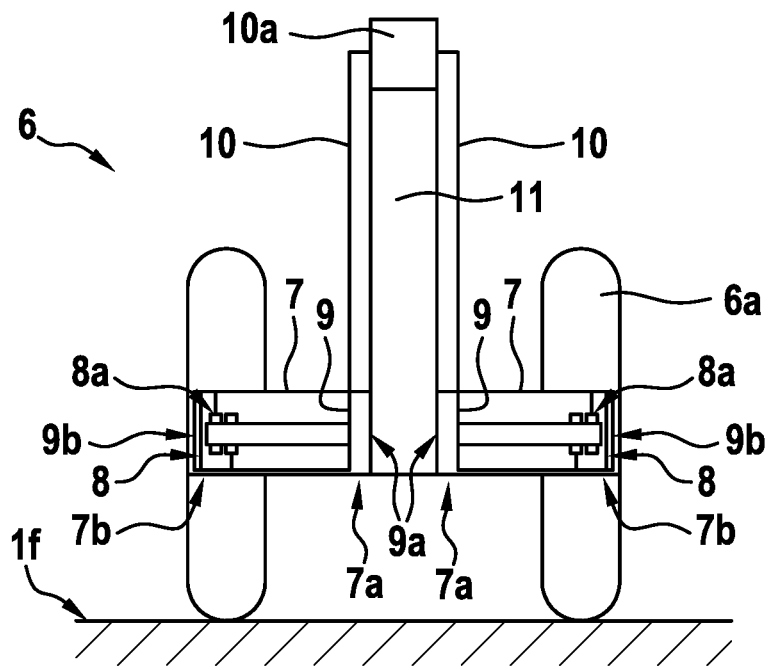
FIG. 3 shows a schematic view of a second type of undercarriage that is provided with two apparatuses according to the present invention, each being provided for sensing an elastic deformation of an associated hollow element of the undercarriage.

FIG. 3 shows the double ground-contacting member undercarriage 6 of FIG. 1 with the two wheels 6a, each of which is connected to an associated hollow element 7 of FIG. 1. The hollow elements 7 are in analogy to FIG. 2 connected to a connecting component, which is referred to by the reference sign 11, and which connects the wheels 6a and, thus, the hollow elements 7 to the fuselage 2 of the helicopter 1 of FIG. 1. As described above with reference to FIG. 2, the connecting component 11 may be a shock absorber or a retracting actuator connected to the fuselage 2 of the helicopter 1 of FIG. 1.

However, it should be noted that the configuration of the double ground-contacting member undercarriage 6 essentially corresponds to the configuration of the single ground-contacting member undercarriage 5 described above with reference to FIG. 2, but with the exception that instead of the single wheel 5a of FIG. 2 here two wheels 6a are connected to the connecting component 11 via two associated hollow elements 7. In each one of the two associated hollow elements 7 a respective apparatus, which corresponds to the apparatus 8 of FIG. 2, is inserted. Therefore, a more detailed description of the double ground-contacting member undercarriage 6 can be omitted for brevity and conciseness.

However, it should be noted that the apparatus 8 is not restricted to use with the hollow element 7 of the undercarriage 6. Various other possible uses are likewise contemplated and described below.

Figure 4:
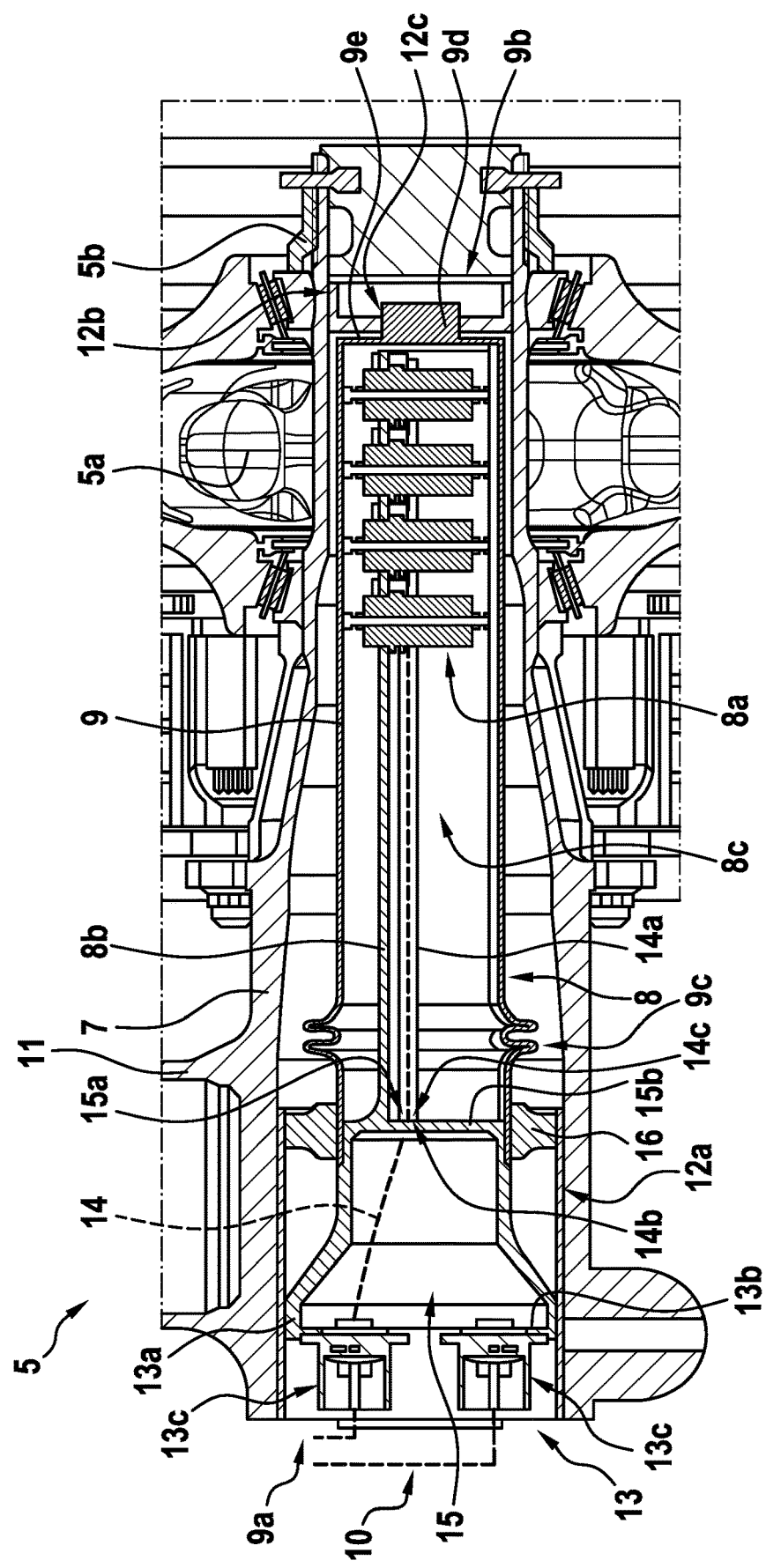
FIG. 4 shows a sectional view of an apparatus according to an aspect of the present invention for sensing an elastic deformation of a hollow element of the undercarriage.

FIG. 4 shows the single ground-contacting member undercarriage 5 with the wheel 5a and the hollow component 7 of FIG. 1 and FIG. 2 for further illustrating the apparatus 8 of FIG. 2 and FIG. 3 according to the present invention. However, it should be noted that the single ground-contacting member undercarriage 5 is merely shown representative for the single ground-contacting member undercarriage 5 of FIG. 2 and the double ground-contacting member undercarriage 6 of FIG. 3, which are similarly provided with the apparatus 8. In other words, in each one of the hollow elements 7 of each one of the undercarriages 5, 6 of FIG. 1, FIG. 2 and FIG. 3 an apparatus is inserted which corresponds to the apparatus 8. Thus, an elastic deformation of each one of the hollow elements 7 can be sensed. However, for simplicity and brevity of the description, it is sufficient to describe a single one of the apparatuses 8 in more detail hereinafter.

According to one aspect, the apparatus 8 is embodied as a line replaceable unit. In other words, the apparatus 8 is preferably only removably mounted to the hollow element 7.

As described above with reference to FIG. 2, the apparatus 8 is provided with the at least one sensor 8a of FIG. 2. It should be noted that a single sensor may be used as the sensor 8a for realizing the apparatus 8. In fact, a single sensor is sufficient, if it is provided with internal redundancy. However, in a preferred realization at least two sensors are employed and, preferentially, four sensors are used as illustrated. Thus, for simplicity and clarity of the present description, reference is made to "the sensors 8a" hereinafter instead of repeatedly referring to the "at least one sensor 8a".

Figure 5:
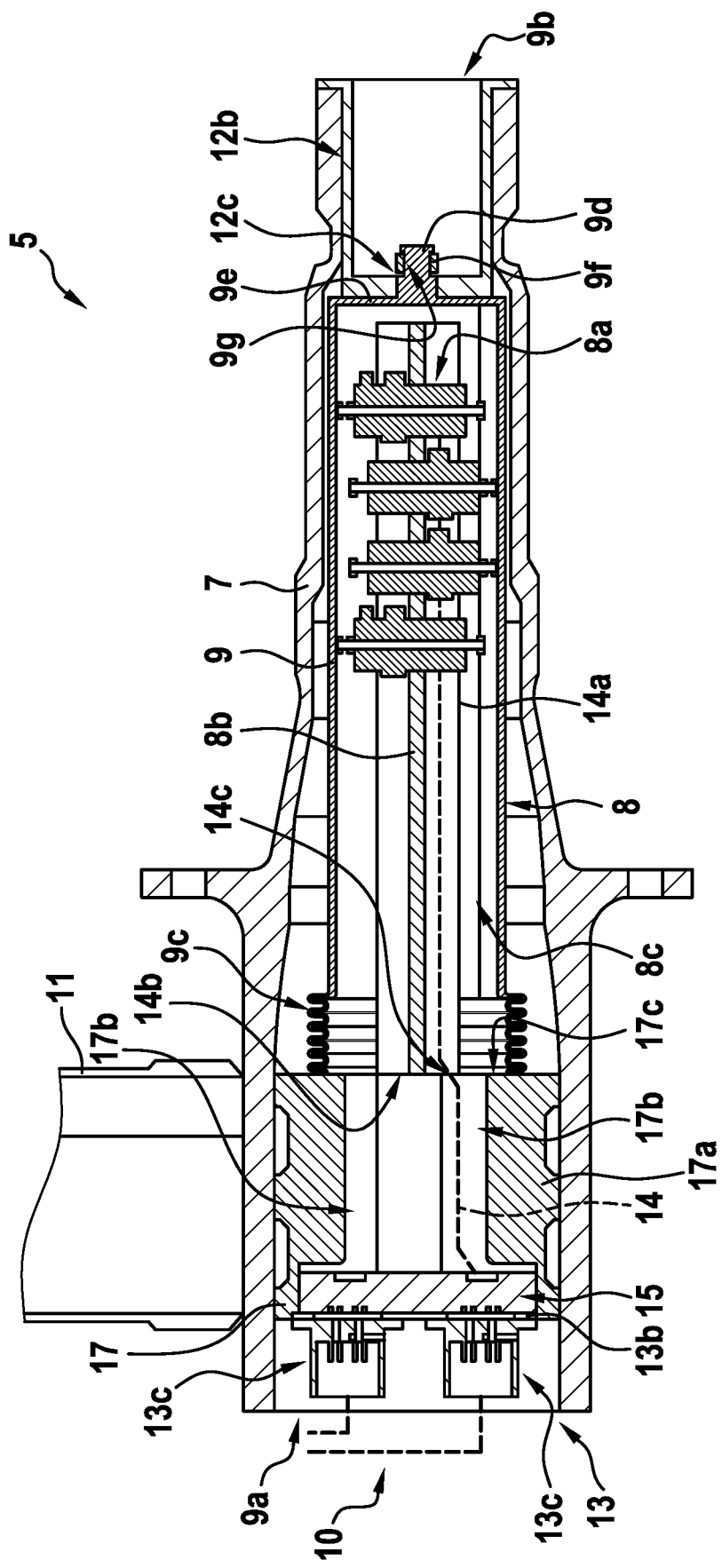
FIG. 5 shows a sectional view of an apparatus according to another aspect of the present invention for sensing an elastic deformation of a hollow element of the undercarriage.

The type of sensor that is used can be selected in an application-specific manner, so that various different types of sensors can be considered. For instance, each sensor may be a capacitive, inductive or optical sensor, or a proximity sensor, a hall sensor, and so on. Furthermore, different types of sensors may simultaneously be used in the apparatus 8. For instance, if four sensors are used for implementing the sensors 8a, two sensors thereof may foe selected from a first type of sensor, while the other two sensors are selected from a second, different type of sensors. Thus, occurrence of common error modes for all sensors at the same time can be limited or even completely avoided. Moreover, the sensors 8a are preferably all installed with the same orientation, as illustrated in FIG. 4, or with different orientations, as illustrated in FIG. 5. This advantageously allows an improved detection of detection of common error modes.

However, it should be noted that, the present invention is neither restricted to a particular type of sensor, nor related to evaluation and processing of data measured by the sensors 8a. Respective sensors and evaluation and processing methods are well-known to the person skilled in the art and are, therefore, not described in detail in the present description. By way of example, suitable evaluation and processing methods are described in the document US 2016/0327958 A1.

As also described above with reference to FIG. 2, the sensors 3a are arranged in the watertight capsule 9 of FIG. 2, which preferably forms a sensor compartment 8c for accommodating the sensors 8a. Preferably, the sensor compartment 8c is pressurized, i. e. provided with a controlled atmosphere, e. g. using a suitable neutral gaz. This advantageously allows to limit maximally any trace of residual humidity that possibly occurs during mounting of the sensors 8a to the watertight capsule 9.

Preferably, the watertight capsule 9 is connected in a watertight manner to a connector device 13 that comprises at least one watertight electrical connector 13c which is electrically connected to one or more of the sensors 8a. By way of example, two watertight electrical connectors 13c are shown. Thus, for simplicity and clarity of the present description, reference is made to "the watertight electrical connectors 13c" hereinafter instead of repeatedly referring to the "at least one watertight electrical connector 13c".

According to one aspect, the watertight electrical connectors 13c forms a first waterproof barrier of the connector device 13 between an outside of the watertight capsule 9 and the sensors 8a. The watertight electrical connectors 13c are preferably arranged on the mounting end region 9a of the watertight capsule 9 resp. the apparatus 8, while the sensors 8a are preferably arranged at the free end region 9b of the watertight capsule 9.

The watertight capsule 9 is according to one aspect further provided with a flexible region 9c that is preferably adapted for allowing at least a vertical bending of the watertight capsule 9 in operation, i. e. that is adapted for compensating longitudinal forces acting on the watertight capsule 9 as well as for compensating tolerances and for reducing bending forces and linearization of the sensors 8a. Preferably, the watertight capsule 9 comprises a conductive material, preferentially metal. However, a respectively selected material can be application-specifically selected based on operational constraints, such as a capability to bend in accordance with an elastic deformation of the hollow element 7, as well as on the basis of manufacturing choices, such as a capability to perform welding, a capability to be qualified, e. g. via mechanical constraints, electrical constraints and so on.

Illustratively, the watertight capsule 9 is provided at its free end region 9b with a mounting extension 9d that is provided at a mounting end wall 9e of the watertight capsule 9. Preferably, the mounting extension 9d is integrally formed in one piece with the mounting end wall 9e. Preferably, the mounting extension 9d is rigidly fastened to a wheel side mounting cup 12b that, in turn, is mounted to the wheel 5a resp. the hollow element 7 in the region of the wheel 5a by means of an associated wheel, nut 5b. In other words, the wheel side mounting cup 12b can be welded, screwed, press-fitted or otherwise mounted to the mounting extension 9d, e. g. by means of an adjustable resp. adjusted mounting.

In order to allow attachment of the wheel side mounting cup 12b to the mounting extension 9d of the watertight capsule, the wheel side mounting cup 12b is preferably provided with a suitable fixation opening 12c through which the mounting extension 9d extends. However, it should be noted that mounting of the watertight capsule 9 resp. the apparatus 8 to the wheel 5a, i. e. suitable mounting techniques, are well-known to the person skilled in the art and not part of the present invention. Therefore, this mounting is not described in more detail hereinafter, for brevity and conciseness.

According to one aspect, the watertight capsule 9 further encloses a stiff rod 8b. The latter is provided inside of the watertight capsule 9 and preferably supports the sensors 8a. According to one aspect, the stiff rod 8b is connected to the connector device 13 via a static attachment 14b. However, the stiff rod 8b may also be Integrally formed in one piece with the connector device 13.

More specifically, the stiff rod 8b is provided in order to ensure that the sensors 8a are correctly positioned inside of the watertight capsule 9. Thus, the stiff rod 8b enables contact between the sensors 8a and the watertight capsule 9, which is required in order to obtain a sufficient accuracy of respective measurements. Furthermore, it allows knowledge of a particular location of the sensors 8a inside of the watertight capsule 9, i. e. without drift and, thus, enabling estimation of a bending effect of the hollow element 7 or, the sensors 8a, so that a correct calibration of respectively obtained sensor data is possible. Furthermore, the stiff rod 8b advantageously enables a correct routing of one or more connecting cables 14 inside of the watertight capsule 9 between the sensors 8a and the watertight electrical connectors 13c.

In other words, the stiff rod 8b must ensure a coherence of sensor mounting and offer sufficient stiffness whatever the operational constraints are, i. e. hot and cold temperature, breaking effect of the hollow element 7, e. g. by means of thermal dilatation, and so on. Consequently, an accurate sensor measurement requires use of a one-piece design for the stiff rod 8b and the connector device 13 according to a preferred aspect. In fact, the stiff rod 8b should preferably be implemented as a fixed part for sensor mounting.

Preferably, the connector device 13 comprises a mounting cup 13a. The mounting cup 13a preferentially supports a connector board 13b to which the watertight electrical connectors 13c are mounted. More specifically, the connector board 13b is preferably attached via a sealed connection to the mounting cup 13a.

Preferably, the mounting cup 13a comprises an opening 15a through which one or more connecting cables 14 exit the connector device 13 towards the sensors 8a. Preferably, a cable bushing 14c is arranged in the opening 15a. The cable bushing 14c preferentially opens the mounting cup 13a towards a cable guide 14a, which is either rigidly attached to the mounting cup 13a or integrally formed in one piece with the mounting cup 13a. The cable guide 14a is provided for guiding the one or more connection cables 14 in the watertight capsule 9.

The cable guide 14a may be embodied such that it allows a separate guiding of connecting cables that are associated with different ones of the sensors 8a. Thus, a segregation between different families resp. types of sensors of the sensors 8a can be provided.

According to one aspect, the mounting cup 13a is rigidly attached to the watertight capsule 9. Preferably, the watertight capsule 9 is retained at the mounting cup 13a via a welded connection.

Illustratively, the mounting cup 13a is at least partly arranged within an associated mounting sleeve 12a. Furthermore, in the region of the welded connection between the mounting cup 13a and the watertight capsule 9, preferably a mounting ring 16 is arranged and connects the watertight capsule 9 resp. the mounting cup 13a in radial direction to the mounting sleeve 12a. The mounting ring 16 preferably serves to guarantee that elastic deformations of the hollow element 7 are transferred to the watertight capsule 9.

It should be noted that a pure mechanical link that ensures the sealing between the watertight capsule 9 and the mounting cup 13a is preferred for attaching the watertight capsule 9 to the mounting cup 13a. This is advantageously achieved via the welded connection described above. Without welding, a specific device such as the mounting ring 16 is required that is suitable to ensure that a mechanical bending of the hollow element 7 is correctly transmitted to the watertight capsule 9. Otherwise, the mounting ring 16 should be considered as being merely optional.

More specifically, the specific device resp. the mounting ring 16 must be arranged between the hollow element 7 and the watertight capsule 9 in order to guarantee that there is no free space, i. e. play, between both components. In other words, the specific device resp. the mounting ring 16 guarantees a correct measurement by the sensors 8a of an elastic deformation, resp. bending, of the hollow element 7 and, similarly, of the watertight capsule 9 and, hence, correct detection of ground contact with a requested and required accuracy. Again, the material used to ensure the bonding will depend on underlying operational constraints, such as temperature, breaking effect, and so on, as well as manufacturing constraints, such as ageing constraints, and so on.

According to one aspect, the mounting sleeve 12a is cylindrical and exemplarily entirely encompasses the connector device 13. Preferably, the mounting sleeve 12a is removably mountable to the hollow element 7. However, the mounting sleeve 12a should only be considered as being an optional component which may be replaced by otherwise suitably embodied connector devices 13. An alternative suitable connector device 13 is described below with reference to FIG. 5.

Preferably, the connector device 13 implements at least one further waterproof barrier that is formed between the first waterproof barrier described above, which is formed by the watertight electrical connectors 13c, and the sensors 8a. Thus, if the first waterproof barrier loses watertightness over the lifetime of the apparatus 8, the further waterproof barrier may assume the waterproof function reliably.

Preferably, the at least one further waterproof barrier includes a second waterproof barrier that is formed by a sealed compartment 15 of the connector device 13. The sealed compartment 15 is preferably arranged between the watertight electrical connectors 13c and the sensors 8a. By way of example, the sealed compartment 15 is embodied by the mounting cup 13a, which is illustratively cup-shaped with an interior or internal space that corresponds or that implements the sealed compartment 15.

By way of example, the sealed compartment 15 is filled with an associated filling material that is schematically illustrating by means of a hatching, preferably entirely, but at least in a region that is opposed to the watertight electrical connectors 13c. A suitable filling material may be a resin and/or a silicone. However, other filling materials are likewise contemplated and may e. g. be selected depending on operational constraints requested for the aircraft certification, targets for ageing effects, and manufacturing constraints. More specifically, the operational constraints may e. g. include environmental conditions, such as external temperature envelope, e. g. hot and cold soak, and so on, as well as specific thermal behavior during breaking. The latter usually depends on the aircraft as such, e. g. its weight, and so on, and operational conditions claimed in a respective flight manual of the aircraft, such as e. g. characteristics of the authorized rolling landing. The manufacturing constraints e. g. include an ageing target, weight, costs, and so on.

According to one aspect, the further waterproof barrier includes a third waterproof barrier that is formed by the cable bushing 14c of the connector device 13. The cable bushing 14c advantageously prevents pollution of the sensor compartment 8c during the filling with the filling material, as described above.

Preferably, the one or more connecting cables 14 that electrically connect the watertight electrical connectors 13c to the sensors 8a are routed through the sealed compartment 15 and exit the connector device 13, i. e. the mounting cup 13a, towards the sensors 8a via the cable bushing 14c, which is preferably arranged between the sealed compartment 15 and the sensors 8a. Illustratively, the sealed compartment is delimited by the connector board 13b which is arranged at an open end of the mounting cup 13a and which closes the latter, and a bottom wall 15b of the mounting cup 13a, where the opening 15a is arranged, to which the cable bushing 14c is mounted.

According to one aspect, the watertight electrical connectors 13c are connected to the data transmission and/or energy supply links 10 of FIG. 2, as schematically illustrated. Thus, measurement data provided by the sensors 8*a* which are sensing elastic deformations of the watertight capsule 9 and, thus, the hollow element 7 can be transmitted to the transceiver 10*a* of FIG. 2 for further processing.

FIG. 5 shows the single ground-contacting member undercarriage 5 with the apparatus 8 for sensing an elastic deformation of the hollow element 7 of the undercarriage 5 of the aircraft 1 of FIG. 1 and FIG. 2. The apparatus 8 is essentially embodied as described above with reference to FIG. 4, so that an extensive detailed description of the apparatus 8 can be omitted for brevity and conciseness. Instead, only the main differences between the apparatus 8 according to FIG. 5 and the apparatus 8 according to FIG. 4 are described hereinafter.

According to one aspect, the connector device 13 of the apparatus 8 now comprises a mounting block 17 instead of the mounting cup 13*a* of FIG. 4. In contrast to the mounting cup 13*a* of FIG. 4, the mounting block 17 comprises a solid block corpus 17*a*. This solid block corpus 17*a* is preferably arranged between the sealed compartment 15 and at least one opening 17*c*. Preferably, the solid block corpus 17*a* is provided with, i. e. embodies at least one cable channel 17*b* that connects the sealed compartment 15 to the opening 17*c*. Preferentially, the solid block corpus 17*a* comprises metal.

It should be noted that the kind of material that is used for realizing the solid block corpus 17*a* generally depends on operational constraints to be sustained, as well as manufacturing constraints, including weight and costs. In any case, it should be noted that the mounting block 17 resp. the solid block corpus 17*a* realizes an undeformable part of the apparatus 8 according to the present invention. Therefore, metal is preferred. Furthermore, metal is most appropriate for creating a welded connection as described above.

According to one aspect, the connecting cables 14 exit the connector device 13, i. e. the mounting block 17, towards the sensors 8*a* through the opening 17*c*. Preferably, the cable bushing 17*c* is arranged in the opening 17*c*.

According to one aspect, the mounting block 17 supports the watertight, electrical connectors 13*c*. More specifically, the watertight electrical connectors 13*c* are preferably mounted to the mounting block 17 by means of the connector board 13*b* that is attached via a sealed connection to the mounting block 17. Accordingly, in order to simply mounting of the connector board 13*b* to the mounting block 17, the sealed compartment 15 is provided in the solid block corpus 17*a* of the mounting block 17. However, compared to the mounting cup 13*a* of FIG. 4, the sealed compartment 15 now exhibits significantly reduced dimensions. As described above, the sealed compartment 15 may likewise be filled with an associated filling material that may comprise at least one of a resin or a silicone.

A further difference between the apparatus 8 according to FIG. 5 and the apparatus 8 according to FIG. 4 consists in the connection of the mounting extension 9*d* of the watertight capsule 9 to the wheel side mounting cup 12*b*. In fact, according to one aspect, the mounting extension 9*d* is now provided with a circumferential retaining groove 9*g*, wherein preferentially a fixing member 9*f*, such as a retaining ring, is arranged for retaining of the wheel side mounting cup 12*b* at the mounting extension 9*d*.

Furthermore, the watertight capsule 9 may be integrally formed in one piece with the mounting block 17. Integrally forming of the watertight capsule 9 with the mounting block 17 in one piece is preferably achieved by means of a welded connection as described above.

It should be noted that modifications to the above described embodiments are within the common knowledge of the person skilled in the art and, thus, also considered as being part of the present invention. More specifically, it should be noted that the above-described undercarriages are only illustratively of the wheel-type. However, the present invention is not restricted to wheel-type undercarriages and other undercarriages with hollow elements that deform under the action of the weight of an associated aircraft are likewise contemplated. For instance, the undercarriages may alternatively be of the skid-type, and so on.

Furthermore, it should be noted that also combinations of the apparatuses according to FIG. 4 and FIG. 5 are contemplated. For instance, the mounting block 17 of FIG. 5 may be used instead of the mounting cup 13*a* in the apparatus 8 according to FIG. 4. Likewise, the mounting extension 9*d* of the apparatus 8 of FIG. 4 may by embodied according to the mounting extension 9*d* of FIG. 5. Furthermore, it should be noted that any of the above-described sensors and even a combination of different sensors may be used with the apparatus 8 of FIG. 4 and FIG. 5.

Moreover, it should be noted that the apparatus 8 of FIG. 4 and FIG. 5 is preferably embodied as a line replaceable unit. In other words, the apparatus 8 of FIG. 4 and FIG. 5 is preferably embodied such that it may easily be exchanged and replaced, if required. Such a line replaceable unit may advantageously be provided with at least one waterproof barrier defined by respective watertight electrical connectors, such as the watertight electrical connectors 13*c* of FIG. 4 and FIG. 5. Each further waterproof barrier should therefore be considered as being an additional improvement, but not a mandatory characteristic of the inventive apparatus 8, resp. line replaceable unit 8 of FIG. 4 and FIG. 5.

Moreover, the apparatus 8 of FIG. 4 and FIG. 5 may be provided with a monitoring device that is suitable to determine if leakage of gas from the sensor compartment 8*c* of FIG. 4 and FIG. 5 occurs. This may e. g. be achieved by means of a suitable detector that is associated with the watertight capsule of FIG. 4 and FIG. 5. Such a monitoring device may further be provided with an adjustment valve that allows to adjust a corresponding level of gas that is provided in the sensor compartment 8*c*. Thus, a required level of gas in the sensor compartment 8*c* may easily and reliably be monitored and adjusted, if required, without exchanging resp. replacing a given apparatus.

Finally, it should be noted that the apparatus 8 of FIG. 4 and FIG. 5 is not limited for use with the undercarriages 5, 6 of the rotary-wing aircraft 1 of FIG. 1. Instead, the apparatus 8 may be used with various different vehicles in general, such as e. g. cars, buses, and so on. Furthermore, the apparatus 8 may be used at other locations than undercarriages, e. g. in connection with the rotor shaft 1*e* of the rotary-wing aircraft 1 of FIG. 1, and so on.

REFERENCE LIST

1 rotary-wing aircraft
1*a* multi-blade main rotor
1*b*, 1*c* rotor blades
1*d* rotor head
1*e* rotor shaft
1*f* surface
2 fuselage
2*a* cabin
3 horizontal stabilizer
4 counter-torque device
4*a* tail rotor 5 single ground-contacting member undercarriages
5a wheel
5b wheel nut
6 double ground-contacting member undercarriage
6a wheel
7 hollow element
7a mounting end
7b free end
8 apparatus with sensors
8a sensors
8b sensor carrying rod
8c sensor compartment
9 watertight sensor capsule
9a mounting end region
9b free end region
9c flexible region
9d mounting extension
9e mounting end wall
9f fixing member
9g retaining groove
10 data transmission and/or energy supply link
10a wireless transceiver
11 connecting component
12a connecting component side mounting sleeve
12b wheel side mounting cup
12c fixation opening
13 connector device
13a connector mounting cup
13b connector board
13c watertight electrical connectors
14 connecting cable
14a cable guide
14b static attachment
14c cable bushing
15 watertight interior compartment
15a compartment opening
15b cup bottom
16 mounting ring
17 connector mounting block
17a solid block corpus
17b cable channel
17c channel opening

What is claimed is:

1. An apparatus for sensing an elastic deformation of a hollow element, wherein the apparatus comprises at least one sensor that is arranged in a watertight capsule, the watertight capsule being connected in a watertight manner to a connector device comprising at least one watertight electrical connector that is electrically connected to the at least one sensor, the at least one watertight electrical connector forming a first waterproof barrier of the connector device between an outside of the watertight capsule and the at least one sensor, and wherein the connector device comprises at least one further waterproof barrier that is formed between the first waterproof barrier and the at least one sensor.

2. The apparatus of claim 1,
wherein the at least one further waterproof barrier comprises a second waterproof barrier that is formed by a sealed compartment of the connector device, the sealed compartment being arranged between the at least one watertight electrical connector and the at least one sensor.

3. The apparatus of claim 2,
wherein the sealed compartment is filled with an associated filling material.

4. The apparatus of claim 3,
wherein the associated filling material comprises at least one of a resin or a silicone.

5. The apparatus of claim 2,
wherein the at least one further waterproof barrier comprises a third waterproof barrier that is formed by a cable bushing of the connector device, and wherein a connecting cable that electrically connects the at least one watertight electrical connector to the at least one sensor is routed through the sealed compartment and exits the connector device towards the at least one sensor via the cable bushing, the cable bushing being arranged between the sealed compartment and the at least one sensor.

6. The apparatus of claim 5,
wherein the connector device comprises a mounting cup, the at least one watertight electrical connector being mounted to the mounting cup by means of a connector board that is attached via a sealed connection to the mounting cup.

7. The apparatus of claim 6,
wherein the mounting cup comprises an opening through which the connecting cable exits the connector device towards the at least one sensor, and wherein the cable bushing is arranged in the opening.

8. The apparatus of claim 6,
wherein the watertight capsule is retained at the mounting cup via a welded connection.

9. The apparatus of claim 8,
wherein the mounting cup is at least partly arranged within an associated mounting sleeve, and wherein a mounting ring is arranged in radial direction between the mounting cup and the associated mounting sleeve.

10. The apparatus of claim 5,
wherein the connector device comprises a mounting block, the at least one watertight electrical connector being mounted to the mounting block by means of a connector board that is attached via a sealed connection to the mounting block.

11. The apparatus of claim 10,
wherein the mounting block comprises an opening through which the connecting cable exits the connector device towards the at least one sensor, and wherein the cable bushing is arranged in the opening.

12. The apparatus of claim 11,
wherein the mounting block comprises a solid block corpus that is arranged between the sealed compartment and the opening, and wherein the solid block corpus comprises at least one cable channel that connects the sealed compartment to the opening.

13. The apparatus of claim 12,
wherein the solid block corpus comprises metal.

14. The apparatus of claim 10,
wherein the watertight capsule is integrally formed in one piece with the mounting block.

15. The apparatus of claim 1,
wherein the watertight capsule comprises a flexible region provided for allowing at least a vertical bending or the watertight capsule in operation.

16. The apparatus of claim 1,
wherein the watertight capsule comprises a conductive material, and wherein the conductive material preferably comprises metal.

17. The apparatus of claim 1,
wherein a stiff rod is provided inside of the watertight capsule the stiff rod supporting the at least one sensor.

18. The apparatus of claim 17, wherein the stiff red is connected to the connector device via a static attachment.

19. The apparatus of claim 17, wherein the stiff rod is integrally formed in one piece with the connector device.

20. A line replaceable unit for sensing an elastic deformation of a hollow element of an undercarriage of an aircraft, the hollow element being connected to at least one ground-contacting member and being deformable by the weight of the aircraft standing by means of the at least one ground-contacting member on a surface, wherein the line replaceable unit comprises at least one sensor that is arranged in a watertight capsule, the watertight capsule being connected in a watertight manner to a connector device comprising at least one watertight electrical connector that is electrically connected to the at least one sensor, the at least one watertight electrical connector forming a waterproof barrier of the connector device between an outside of the watertight capsule and the at least one sensor.

\* \* \* \* \*